United States Patent
Zosel et al.

(10) Patent No.: US 9,794,462 B2
(45) Date of Patent: Oct. 17, 2017

(54) ILLUMINATION SYSTEM WITH SIDE-EMITTING ILLUMINATION, TARGETING, AND CONFIRMATION

(71) Applicant: Microscan Systems, Inc., Renton, WA (US)

(72) Inventors: Andrew J. Zosel, Covington, WA (US); Michael C. Messina, Hooksett, NH (US); Brian Thompson, Bow, NH (US)

(73) Assignee: Microscan Systems, Inc., Renton, WA (US)

( * ) Notice: Subject to any disclaimer, the term of this patent is extended or adjusted under 35 U.S.C. 154(b) by 0 days.

(21) Appl. No.: 14/675,143

(22) Filed: Mar. 31, 2015

(65) Prior Publication Data

US 2016/0295084 A1    Oct. 6, 2016

(51) Int. Cl.
| | |
|---|---|
| *H04N 5/225* | (2006.01) |
| *F21V 5/04* | (2006.01) |
| *F21V 11/02* | (2006.01) |
| *G06K 7/10* | (2006.01) |
| *G02B 7/09* | (2006.01) |
| *G02B 27/09* | (2006.01) |
| *F21Y 101/00* | (2016.01) |
| *F21Y 115/10* | (2016.01) |

(52) U.S. Cl.
CPC .......... *H04N 5/2256* (2013.01); *F21V 5/048* (2013.01); *F21V 11/02* (2013.01); *G02B 27/0988* (2013.01); *G06K 7/10732* (2013.01); *F21Y 2101/00* (2013.01); *F21Y 2115/10* (2016.08)

(58) Field of Classification Search
CPC ....... H04N 5/2256; F21V 5/048; F21V 11/02; G06K 7/10732; G02B 27/0988; F21Y 2115/10; F21Y 2101/00
See application file for complete search history.

(56) References Cited

U.S. PATENT DOCUMENTS

| | | | |
|---|---|---|---|
| 5,449,892 A | 9/1995 | Yamada | |
| 5,750,974 A | 5/1998 | Sasaki et al. | |
| 5,756,981 A | 5/1998 | Roustaei et al. | |
| 7,311,260 B2 * | 12/2007 | Zosel ................ | G06K 7/10881 235/454 |
| 8,028,913 B2 * | 10/2011 | Liu .................... | G06K 7/10722 235/455 |

(Continued)

FOREIGN PATENT DOCUMENTS

EP    1 045 330 A2    10/2000

OTHER PUBLICATIONS

EP 16 16 3192—Extended European Search Report mailed Aug. 25, 2016, 7 pages.

*Primary Examiner* — Albert Cutler
(74) *Attorney, Agent, or Firm* — Blakely, Sokoloff, Taylor & Zafman LLP

(57) ABSTRACT

Embodiments are disclosed of a lighting apparatus including a fixture adapted to accommodate a camera having imaging optics that define an optical axis, wherein the fixture includes an open end through which the imaging optics can capture an image. One or more side-emitting illumination light sources are positioned adjacent to the open end, the plurality of side-emitting light sources positioned to direct light toward a plane intersected by the optical axis. Other embodiments are disclosed and claimed.

14 Claims, 7 Drawing Sheets

(56) References Cited

U.S. PATENT DOCUMENTS

| | | | |
|---|---|---|---|
| 8,857,720 B1* | 10/2014 | Lei | G06K 7/10742 |
| | | | 235/462.42 |
| 2002/0047046 A1 | 4/2002 | Piva et al. | |
| 2003/0136842 A1 | 7/2003 | Zosel et al. | |
| 2007/0152064 A1 | 7/2007 | Nunnink et al. | |
| 2008/0308824 A1* | 12/2008 | Shchekin | G02B 6/0073 |
| | | | 257/98 |
| 2015/0021399 A1* | 1/2015 | Gurevich | G06K 7/10732 |
| | | | 235/462.21 |

* cited by examiner

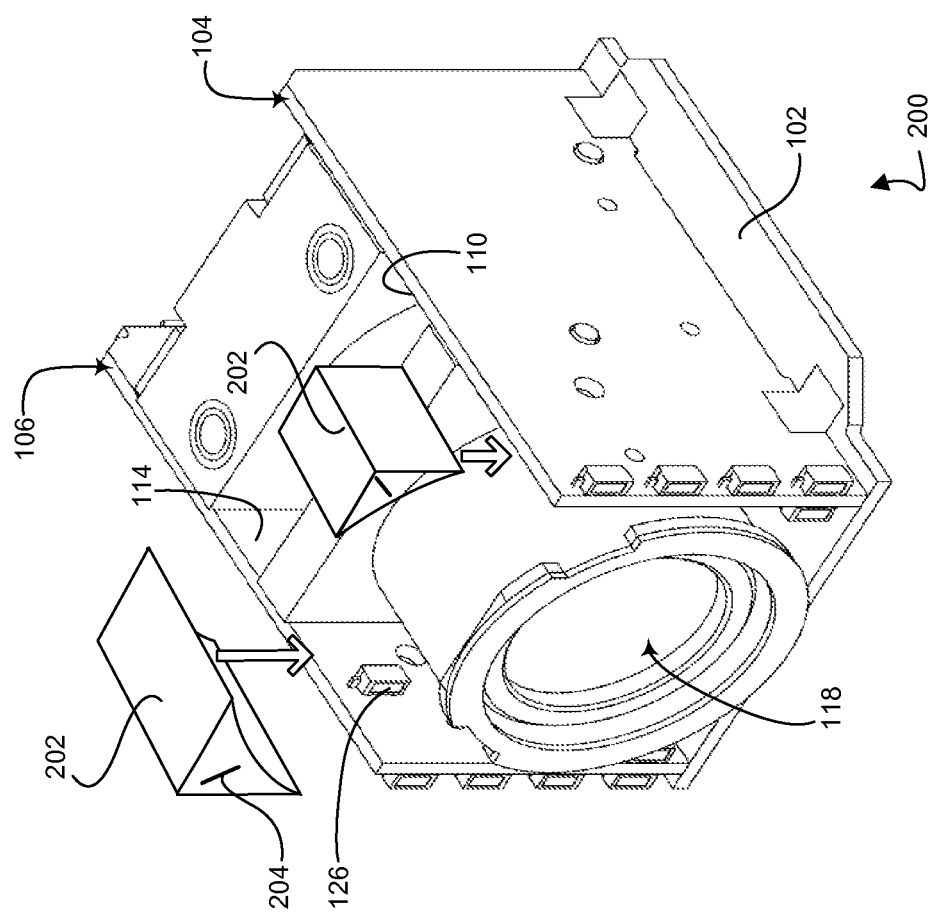

ILLUMINATION SYSTEM WITH SIDE-EMITTING ILLUMINATION, TARGETING, AND CONFIRMATION

TECHNICAL FIELD

The disclosed embodiments relate generally to optical data acquisition devices and in particular, but not exclusively, to optical data acquisition devices having illumination systems that include side-emitting illumination lights, and can also include side-emitting targeting lights and side-emitting confirmation lights.

BACKGROUND

Optical data capture devices, which include bar code readers, matrix code readers, and machine vision systems, are important tools in inspection, tracking, and other consumer and industrial applications. Generally, optical data capture device include a camera that captures an image of an object and then extracts information from the captured image.

A difficulty encountered in these devices is that of ensuring that the camera acquires an image of the object from which it can extract information. Among other things, obtaining good images means providing adequate lighting of the object, and ensuring that the object is positioned within the camera's field of view, preferably at the center of the field of view, and that the image of the object is in focus.

A final related problem is providing feedback to a user when information has been successfully extracted from a captured image. Most current devices either provide an audible tone if information is successfully extracted or have one or more light-emitting diodes (LEDs) on the chassis that light up if information is successfully extracted. Both approaches have disadvantages. If the audible tone is too loud, it quickly grows annoying to human operators, which could lead them to switch off the tone or ignore it altogether. But if the tone's volume is reduced to make it less annoying, the operator may not be able to hear the tone in a noisy environment. With LEDs on the scanner chassis, the user must look away from the object to look at the LEDs to see if they light up. This is a distraction that takes the user's attention away from keeping the object within the field of view.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIGS. 2A-2B are perspective drawings of an embodiment of an optical data capture device including targeting optics.

DETAILED DESCRIPTION OF THE ILLUSTRATED EMBODIMENTS

Embodiments are described of an apparatus, system and method for optical data acquisition devices having illumination systems that include side-emitting illumination lights, and can also include side-emitting targeting lights and side-emitting confirmation lights. Specific details are described to provide an understanding of the embodiments, but one skilled in the relevant art will recognize that the invention can be practiced without one or more of the described details or with other methods, components, materials, etc. In some instances, well-known structures, materials, or operations are not shown or described in detail but are nonetheless encompassed within the scope of the invention.

Reference throughout this specification to "one embodiment" or "an embodiment" means that a described feature, structure, or characteristic can be included in at least one described embodiment, so that appearances of "in one embodiment" or "in an embodiment" do not necessarily all refer to the same embodiment. Furthermore, the particular features, structures, or characteristics may be combined in any suitable manner in one or more embodiments.

Figure 1A:
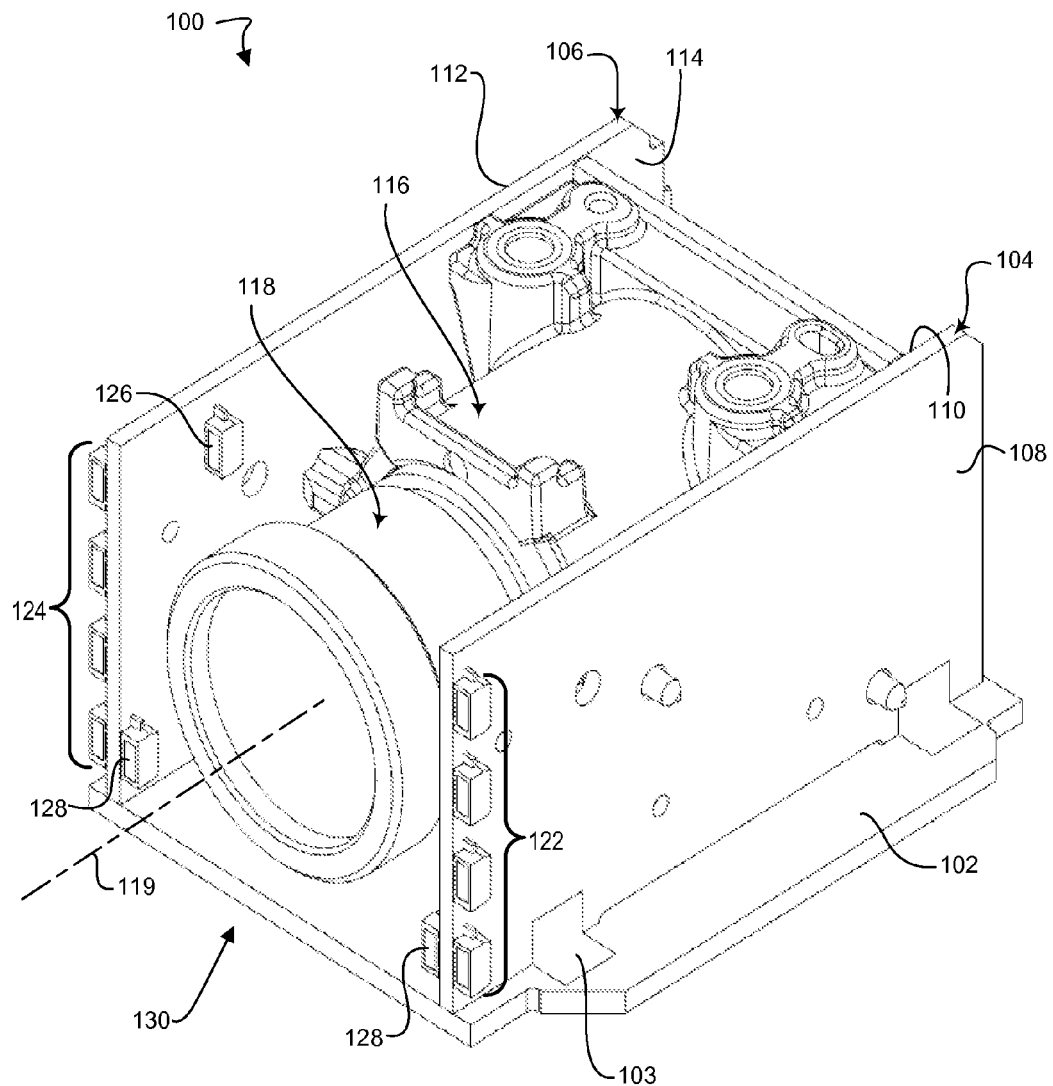
FIGS. 1A-1C are respectively a perspective view, a top view, and a front view of an embodiment of an optical data capture device.
Figure 1B:
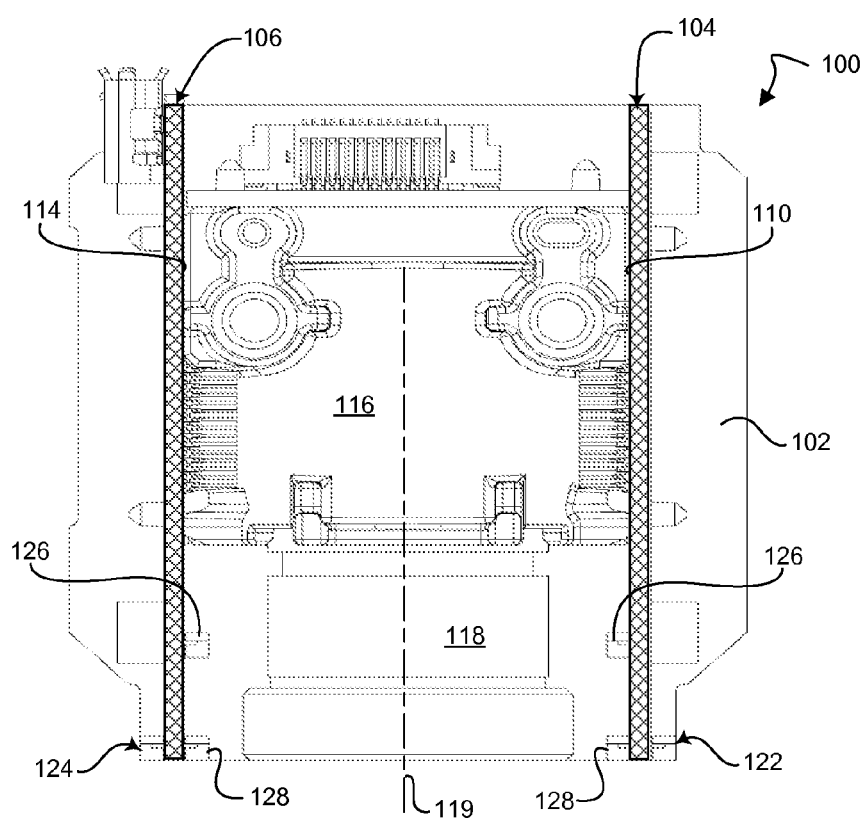
Figure 1C:
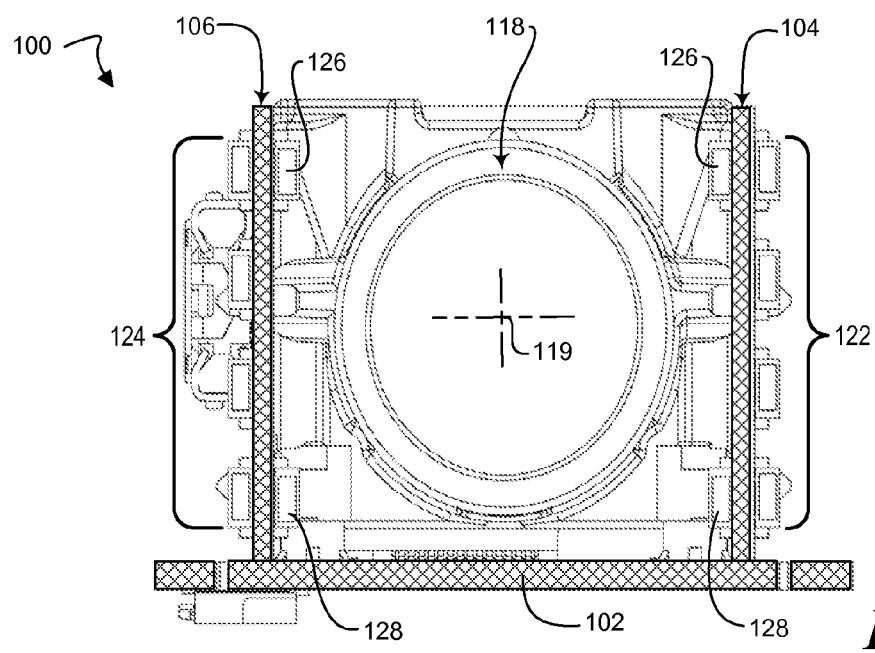

FIGS. 1A-1C together illustrate an embodiment of an optical data capture device 100; FIG. 1A is a perspective view, FIG. 1B a top view, and FIG. 1C a front view. Device 100 includes a camera 116 and associated imaging optics 118, as well as a fixture designed to accommodate the camera and imaging optics while providing side-emitting lighting for the camera.

The fixture includes a base circuit board 102 to which are attached two spaced-apart circuit boards 104 and 106. In the illustrated embodiment circuit boards 104 and 106 are substantially parallel to each other, but in other embodiments they need not be parallel. Circuit board 102 is substantially planar and can be any kind of circuit board that can withstand the expected structural loads and that can provide the required electrical connections. In one embodiment circuit board 102 can be a single-layer circuit board, but in other embodiments it can be a multi-layer printed circuit board.

Spaced-apart circuit boards 104 and 106 have their edges positioned on base circuit board 102 and are attached to base circuit board 102 so that circuit boards 104 and 106 are substantially parallel to each other and are substantially perpendicular to circuit board 102. In the illustrated embodiment spaced-apart circuit boards 104 and 106 are attached to base circuit board 102 using solder 103, but in other embodiments other methods such as clips, fasteners, etc., can be used to attach spaced-apart circuit boards 104 and 106 to base circuit board 102. This arrangement of circuit boards 102, 104, and 106 creates an open end 130 of the fixture through which imaging optics 118 can capture an image when camera 116 and imaging optics 118 are installed in the fixture.

Circuit board 104 is substantially planar and has an inside surface 110 whose normal vector points toward circuit board 106 and an outside surface 108 whose normal vector points away from circuit board 106. Circuit board 106 is also substantially planar and has an inside surface 114 whose normal vector points toward circuit board 104 and an outside surface 112 whose normal vector points away from circuit board 104. Both circuit boards 104 and 106 can be any kind of circuit board strong enough to withstand the expected structural loads and provide the required electrical connections. In one embodiment circuit boards 104 and 106 are single-layer circuit boards, but in other embodiments they can be multi-layer circuit boards. In still other embodiments, circuit boards 104 and 106 need not be the same type of circuit board.

Camera 116, imaging optics 118, or both, can be secured within the fixture by attaching them to circuit board 102. Camera 116 can be any kind of camera capable of electronically capturing an image. In one embodiment camera 116 can be camera based on a complementary metal oxide semiconductor (CMOS) image sensor, but in other embodiments camera 116 can be based on other types of image sensors such as a charge-coupled device (CCD). Imaging optics 118 are optically coupled to the image sensor within camera 116 and have an optical axis 119. Imaging optics 118 can include any combination of refractive, reflective, and diffractive optical elements.

Device 100 includes three types of side-emitting light sources: illumination lighting, targeting lighting, and confirmation lighting. Device 100 includes all three types, but other embodiments of device 100 need not include all three. Other embodiments, for instance, can have only illumination, only targeting, or only conformation. Still other embodiments can have any combination of two or more of these types of side-emitting lighting.

The side-emitting illumination lighting includes two arrays of side-emitting light sources. Illumination array 122 includes a set of four side-imaging light sources positioned on outside surface 108 of circuit 104 along a line at or near the edge of circuit board 104 closest to open end 130 of the fixture. The individual sources within illumination array 122 are oriented to point in the direction of optical axis 119, so that light from the array can illuminate a plane that intersects optical axis 119. Illumination array 124 is positioned on the opposite side of open end 130 and on the opposite side of imaging optics 118 from illumination array 122. Illumination array 124 includes four side-emitting sources light positioned on outside surface 112 of circuit board 106 along a line at or near the edge of circuit board 106 closest to open end 130 of the fixture. In the illustrated embodiment, side-emitting illumination arrays 122 and 124 are both present and each has four individual side-emitting light sources. But in other embodiments illumination arrays 122 and 124 can have more or less individual side-emitting light sources than shown (as few as one), need not have the same number of sources, and need not both be present. The individual side emitting sources positioned within each illumination array are side-emitting light emitting diodes (LEDs) in one embodiment, but in other embodiments can be other types of side-emitting light source.

The targeting lighting includes a pair of side-emitting targeting light sources 126 positioned on the fixture on opposite sides of camera 116 and imaging optics 118. One light source 126 is positioned on inside surface 110 (not visible in FIG. 1A, but see FIGS. 1B-1C), and another on inside surface 114. Side-emitting light sources 126 are oriented to point substantially in the direction of optical axis 119 so that targeting light can illuminate a plane that intersects optical axis 119. Side-emitting targeting light sources 126 are each set back from the front edges of circuit boards 104 and 106 by a selected distance to accommodate the targeting optics. In one embodiment side-emitting targeting light sources 126 can be side-emitting LEDs, but in other embodiments they can be another type of side-emitting light source. In the illustrated embodiment there is one side-emitting targeting light source 126 on each inside surface, but in other embodiments there could be more than one on each inside surface. In still other embodiments each inside surface need not have the same number of side-emitting targeting light sources.

The confirmation lighting includes a pair of side-emitting confirmation light sources 128 positioned on the fixture on opposite sides of camera 116 and imaging optics 118. One confirmation light source 128 is positioned on inside surface 110 at or near the open end of the fixture at on the lower part of inside surface 110 near where circuit board 104 intersects base circuit board 102. Another confirmation light source 128 is placed in a corresponding position at the lower part of inside surface 114 at or near the open end of the fixture. Both side-emitting confirmation light sources 128 are oriented to point substantially in the direction of optical axis 119, so that light emitted from confirmation light sources 128 can illuminate a plane that intersects optical axis 119 (see FIG. 4). The illustrated embodiment has one confirmation light source on each inside surface, but other embodiments this can include more confirmation light sources and need not have the same number of confirmation light sources on each side.

In different embodiments of device 100 the different side-emitting light sources can emit different colors of light. For instance, in one embodiment the side-emitting illumination light sources can emit white light, the side-emitting targeting light sources can emit red light, and the side-emitting confirmation light sources can emit green light. In other embodiments the colors emitted by the different side-emitting light sources can of course be different than those listed. In still other embodiments, some of the side-emitting light sources can emit non-visible wavelengths (i.e., non-visible colors), while the others image visible wavelengths. For instance, in one embodiment, the side-emitting illumination light sources can emit infrared light, while the side-emitting targeting light sources emit red light and the side-emitting confirmation light sources emit green light.

Figure 2B:
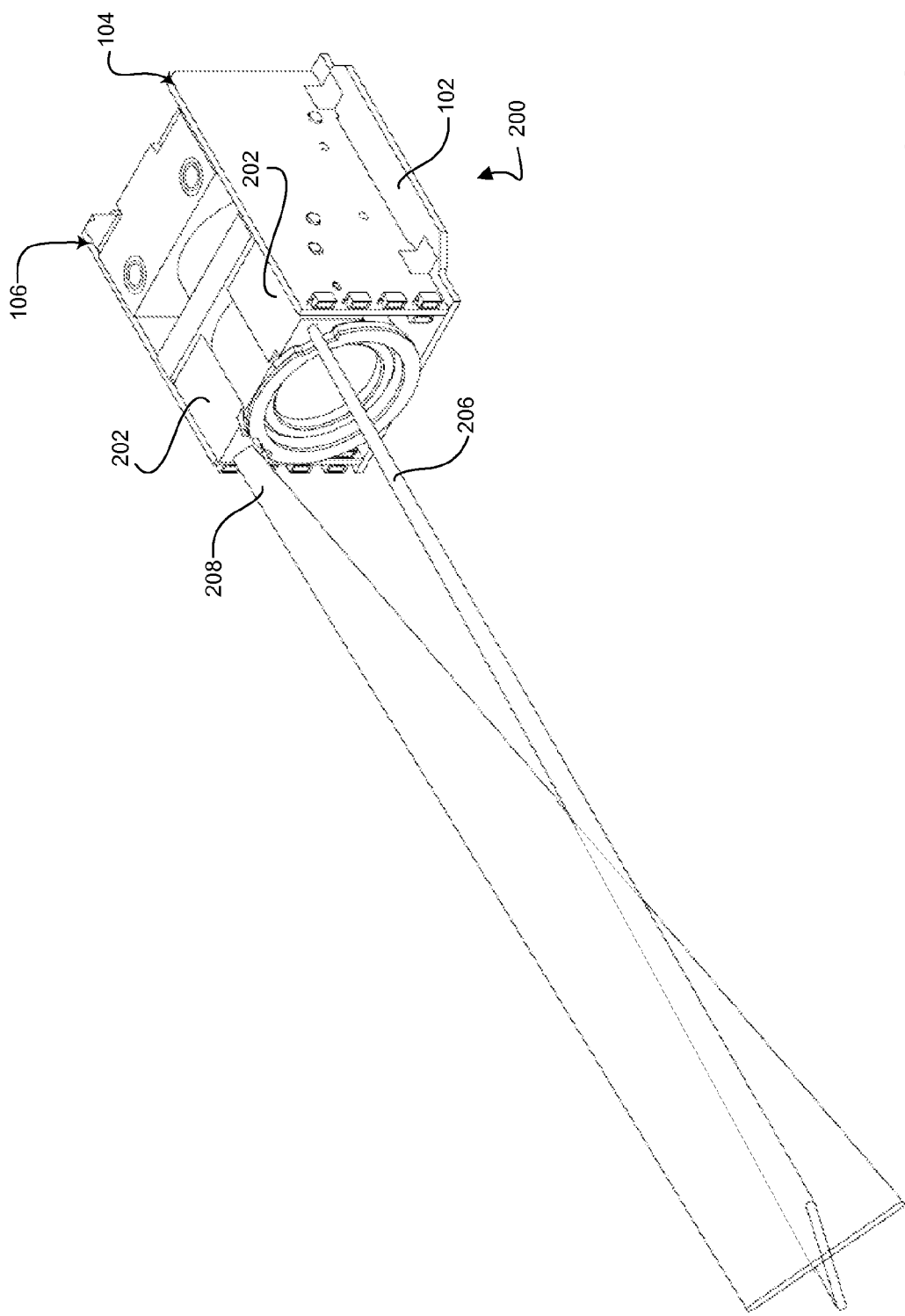

FIGS. 2A-2B illustrate an embodiment of an optical data capture device 200; FIG. 2A illustrates its construction. Device 200 is similar in most respects to device 100. The primary difference is that device 200 includes targeting optics optically coupled to side-emitting targeting light sources 126. Each side-emitting targeting light source 126 is coupled to a corresponding targeting optical element 202. The targeting optical elements 202 fit within the fixture between imaging optics 118 and inside surfaces 110 and 114. Each targeting optical element 102 includes a beam-shaping element on its end; in the illustrated embodiment the beam shaping element is a slit 204, but in other embodiments it can be other shapes. Further optics can be put within each targeting optical element 202 to focus, collimate, or otherwise condition the light from sources 126 before it emerges through slits 204. The additional optics within targeting optical element 202 can include refractive, reflective, or diffractive elements, or any combination of these.

FIG. 2B illustrates an embodiment of the targeting operation of device 200. With targeting optics 202 in place when side-emitting targeting light sources 126 are activated their light is conditioned by optics within targeting optical elements 202, if any, and then exits through slit 204 as a pair of intersecting flat beams 206 and 208. As explained below for FIGS. 3A-3D, the shapes of flat beams 206 and 208 and the angles at which targeting optics 202 emit the flat beams are designed so that the projections of the flat beams on a plane intersected by optical axis 119 are bars. Optical elements 202 are also designed so that, in the range of distances where the bars intersect, they intersect at the center of the field of view of imaging optics 118 independently of the distance of the plane from the imaging optics. And, as further discussed below, the shape of the intersection of the bars gives a user focus distance guidance.

FIGS. 3A-3D illustrate the targeting operation of an embodiment of an optical data capture device 200. In the illustrated embodiment, device 200 is shown with an embodiment of a housing, but other embodiments can have a different housing or no housing at all.

Figure 3A:
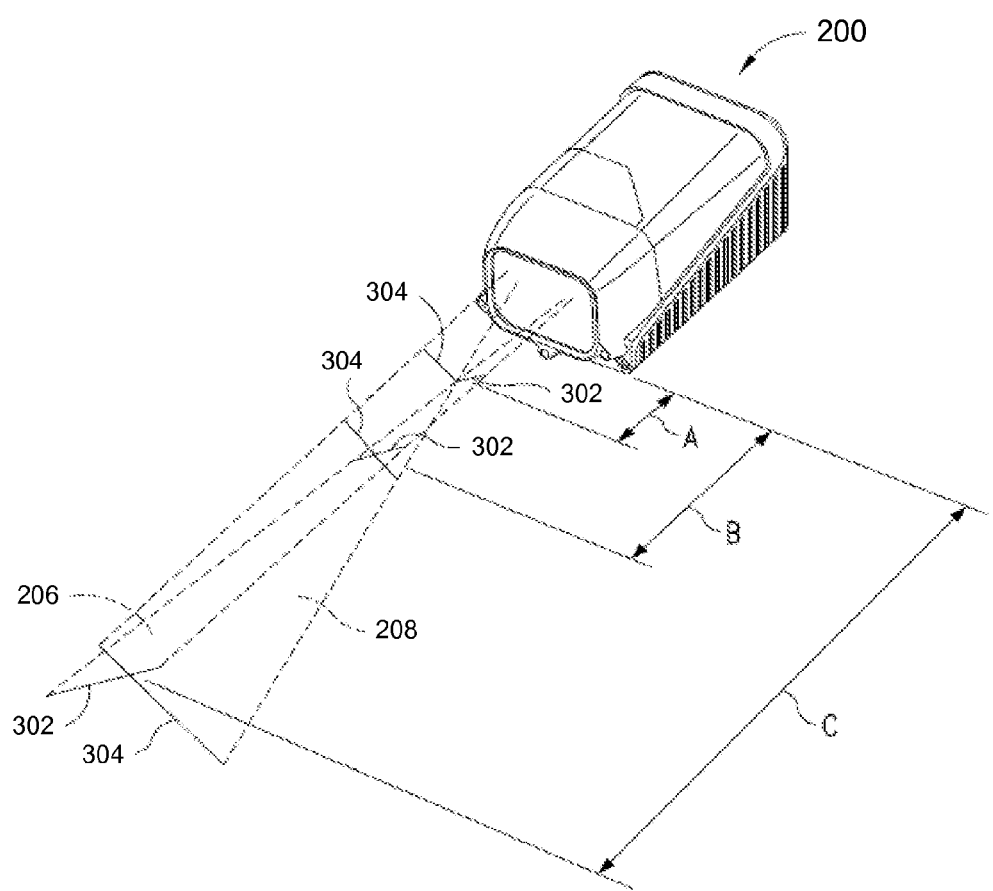
FIGS. 3A-3D are drawings showing an embodiment of the operation of the targeting optics shown in FIGS. 2A-2B.

FIG. 3A illustrates an embodiment of the targeting operation of device 200. Imaging optics 118 are selected based on the size of the object whose image will be captured and the distance the object will be placed from device 200: optics with a long focal length and small field of view can be used for small objects far from device 200, and optics with a shorter focal length and larger field of view can be used for large objects close to device 200. In the illustrated embodiment, then, whether device 200 captures images at focus distance A, B, or C depends on imaging optics 118.

To allow a user to easily align the field of view of optics 118 with the object whose image will be captured, device 200 uses the targeting optics and side-emitting targeting light sources described above to project first light beam 206 and second light beam 208 toward a plane on which the object is located. Both light beams 206 and 208 are shaped to emerge from the targeting optics 202 as "flat" beams, so that the projection of each beam on a plane will have the shape of a bar. Both beams 206 and 208 are aligned such that the bars 302 and 304 created by their projection on a plane will intersect. And beams 206 and 208 are aligned so that, in the range of distances where the bars intersect, the intersection will be in the center of the field of view of optics 118 regardless of distance from device 200. In other words, whether the object whose image will be captured is at distance A, B, or C from optics 118, the intersection of the bars will indicate the center of the field of view. Thus, if the user places the object at the intersection of the bars, the object will be properly positioned to be imaged by the system.

Figure 3B:
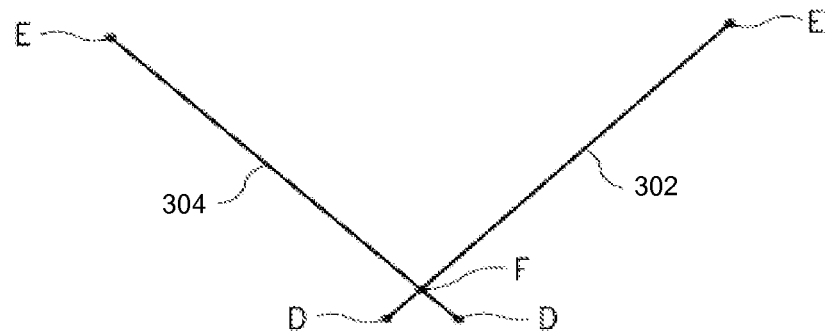
Figure 3C:
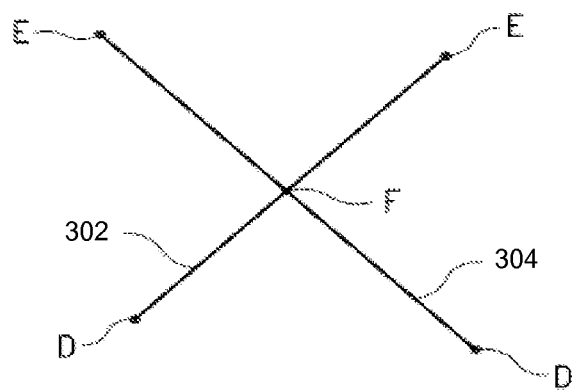
Figure 3D:
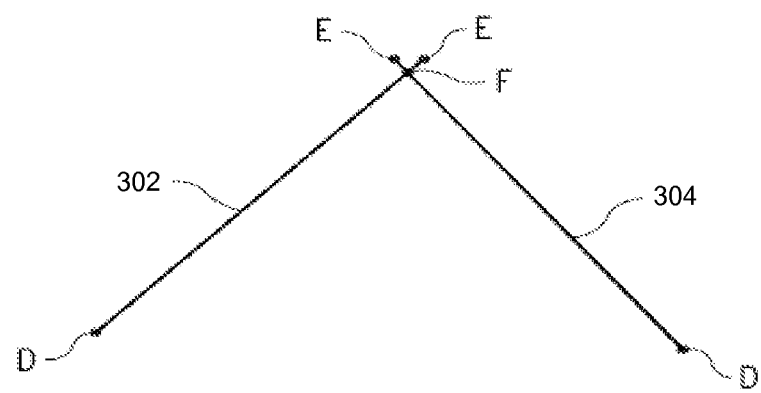

FIGS. 3B-3D illustrate an embodiment of the relationship between the shape formed by the intersection of the bars 302 and 304 and the focus distance (A, B, or C) between device 200 and the focus plane. In other embodiments, different geometric shapes besides bars could also be used, instead of or in addition to the bars, to convey field-of-view and focus information. For example, polygonal shapes such as squares and triangles could be used, as well as shapes such as circles, etc. Each bar 302 and 304 has a first end E and a second end D. The bars intersect at point F which, as explained above, corresponds to the center of the field of vision of imaging optics 118, independent of the distance between device 200 and the plane.

As further explained below, the exact shape of the intersection of bars 302 and 304 depends on the distance between device 200 and the plane on which the bars are projected. By using the combination of the intersection of the bars and the shape formed by intersection of the bars, a user can easily position the image to be scanned in the field of view at the proper distance to obtain the optimum focus, so that camera 116 within device 200 can obtain a sharp image.

FIG. 3B illustrates the pattern formed by the bars at focus distance A from the device 200. In this case, the bars 302 and 304 intersect each other at or near their second ends D, thus substantially forming a "V" shape. If imaging optics 118 are such that A is the proper focus distance, a user simply adjusts the distance from device 200 to the plane until the "V" shape is formed, and then positions the object at or near the intersection F. The object is then properly positioned and in focus for capture by the optics.

FIG. 3C illustrates the intersection of the bars 302 and 304 when the plane on which they are projected is a distance B from the system. In this case, bars 302 and 304 intersect substantially in an "X" shape, with intersection F again being the center of the field of view of the optics. In this X-shape, bars 302 and 304 substantially bisect each other; in other words, each bar roughly cuts the other in half. Again, if imaging optics 118 are such that B is the correct focus distance, a user adjusts the distance from the system until the X shape is formed and positions the object at intersection F. The object is then at the proper distance and in the proper location for image capture.

In FIG. 3D, first bar 302 and second bar 304 intersect at or near their first ends E, thus substantially taking the shape of a caret (""). When the bars intersect in the caret shape shown, the user knows that the plane on which the bars are projected is a distance C from the system, and that the point F is at the center of the field of view of the imaging optics. Thus, if the optics are such that the focus distance is distance C, the user simply adjusts the distance from the system 10 such that the caret-shaped intersection is created, and then positions the object to be imaged at or near intersection F.

Figure 4:
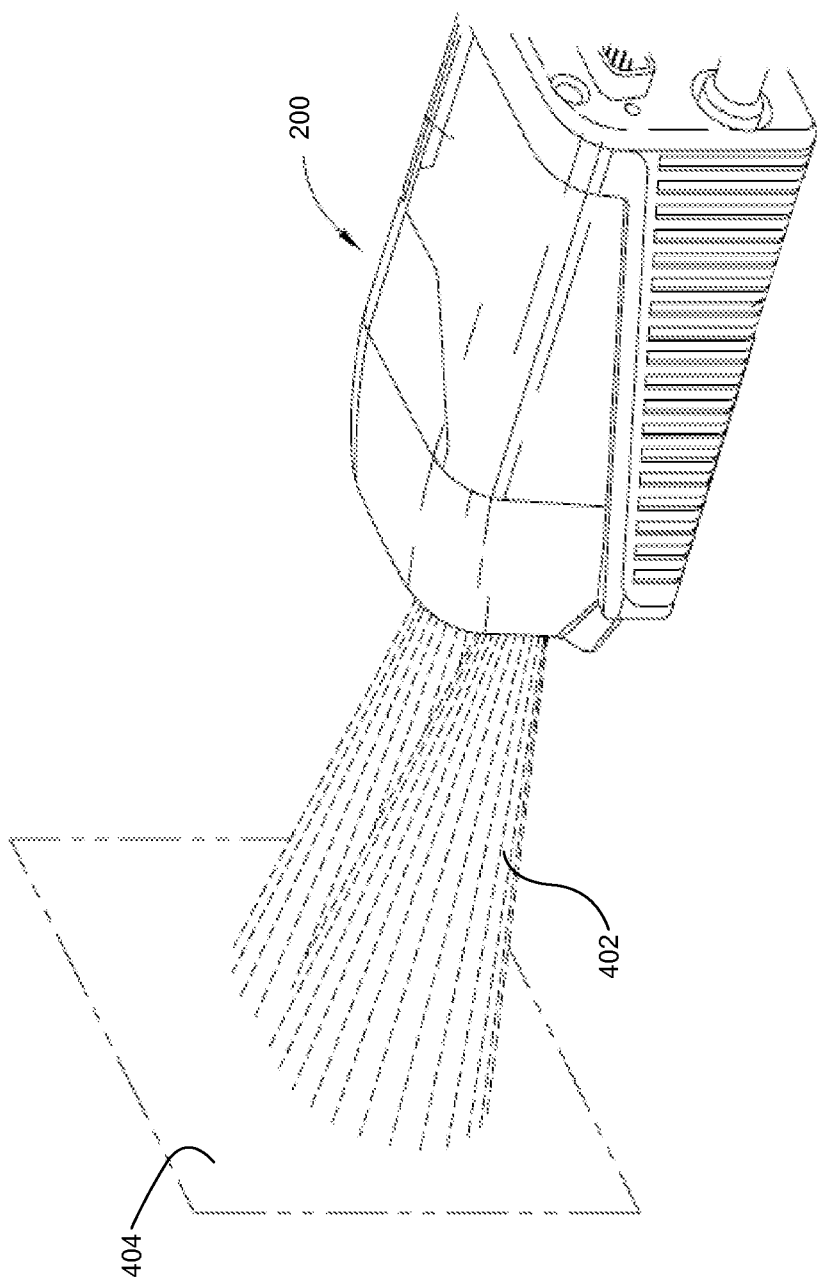
FIG. 4 is a perspective drawing of an embodiment of an optical data capture device including conformation optics.

FIG. 4 illustrates an embodiment of the operation of side-emitting conformation light sources 128. Side-emitting confirmation light sources 128 can be coupled to image processing electronics coupled to camera 116 in device 100 or 200. After an image is captured using the camera's image sensor, it is processed using processing hardware such as a microprocessor a digital signal processor (DSP), or the like. If the processing hardware successfully decodes the image, it sends a signal to side-emitting conformation light sources 128. In response to this signal, light sources 128 flash, thus projecting a quick burst of light 402 onto plane 404 containing the object and providing feedback to the user that information was successfully extracted from a captured image. That way the user need not take his or her eyes away from the field or the image to know whether a successful read was accomplished, but can instead wait for the flash, which indicates successful extraction of information from the image. In one embodiment, confirmation light sources 128 are different color than the other of light sources so that the user can easily distinguish the confirmation flash. For instance, side-emitting confirmation light sources 128 can be green, although this can of course be different in other embodiments.

The above description of embodiments, including what is described in the abstract, is not intended to be exhaustive or to limit the invention to the described forms. Specific embodiments of, and examples for, the invention are described herein for illustrative purposes, but various equivalent modifications are possible within the scope of the invention in light of the above detailed description, as those skilled in the relevant art will recognize.

The terms used in the following claims should not be interpreted to limit the invention to the specific embodiments disclosed in the specification and the claims. Rather, the scope of the invention is to be determined entirely by the following claims, which are to be interpreted using established claim interpretation doctrines.

The invention claimed is:

1. An apparatus comprising:
   a fixture adapted to accommodate a camera having imaging optics that define an optical axis, the fixture comprising:
   a base circuit board to which the camera can be mounted with the imaging optics pointing out an open end of the fixture, and
   a pair of spaced-apart circuit boards coupled to the base circuit board, each spaced-apart circuit board having an inside surface whose normal points toward the other and an outside surface whose normal points away from the other spaced-apart circuit board; and one or more arrays of side-emitting illumination light sources positioned on the outside surface of at least one spaced-apart circuit board, the one or more arrays of side-emitting illumination light sources positioned to direct light in the direction of the optical axis toward a plane intersected by the optical axis when the camera is present.

2. The apparatus of claim 1, further comprising:

a plurality of side-emitting targeting light sources positioned on at least one of the spaced-apart circuit boards at a selected distance from the open end; and projection optics optically coupled to the plurality of side-emitting targeting light sources to project a plurality of targeting light beams onto the plane intersected by the optical axis, wherein, when the camera is installed in the fixture, the projections of the plurality of targeting light beams on the plane are bars that intersect at the center of the field of view of the imaging optics independent of the distance between the imaging optics and the plane.

3. The apparatus of claim 2 wherein the projection optics comprise a pair of optical elements, each optical element coupled to one or more corresponding side-emitting targeting light sources, wherein each optical element includes a beam-forming element to shape the emitted beam.

4. The apparatus of claim 3 wherein the beam-forming element is a slit.

5. The apparatus of claim 3 wherein the bars comprise first and second bars each with first and second ends, and wherein:

if the first and second bars intersect at or near both their first ends, substantially forming a caret shape, the plane is at a first focus distance;

if the first and second bars bisect each other, the plane is at a second focus distance; and if the first and second bars intersect each other at or near both their second ends, substantially forming a V shape, the plane is at a third focus distance.

6. The apparatus of claim 2, further comprising one or more side-emitting confirmation light sources coupled to the fixture and pointing toward the plane intersected by the optical axis.

7. The apparatus of claim 6 wherein the side-emitting illumination light sources, the side-emitting targeting light sources, and the side-emitting confirmation light sources each emit different colored light.

8. A system comprising:

a camera including imaging optics that define an optical axis;

a fixture including:

a base circuit board to which the camera is mounted with the imaging optics pointing out an open end of the fixture, and a pair of spaced-apart circuit boards coupled to the base circuit board, each spaced-apart circuit board having an inside surface whose normal points toward the other and an outside surface whose normal points away from the other spaced-apart circuit board; and one or more arrays of side-emitting illumination light sources positioned on the outside surface of at least one spaced-apart circuit board, the one or more arrays of side-emitting illumination light sources positioned to direct light in the direction of the optical axis toward a plane intersected by the optical axis.

9. The system of claim 8, further comprising:

a plurality of side-emitting targeting light sources positioned on at least one of the spaced-apart circuit boards at a selected distance from the open end; and projection optics optically coupled to the plurality of side-emitting targeting light sources to project a plurality of targeting light beams onto the plane intersected by the optical axis, wherein, when the camera is installed in the fixture, the projections of the plurality of targeting light beams on the plane are bars that intersect at the center of the field of view of the imaging optics independent of the distance between the imaging optics and the plane.

10. The system of claim 9 wherein the projection optics comprise a pair of optical elements, each optical element coupled to one or more corresponding side-emitting targeting light sources, wherein each optical element includes a beam-forming element to shape the emitted beam.

11. The system of claim 10 wherein the beam-forming element is a slit.

12. The system of claim 10 wherein the bars comprise first and second bars each with first and second ends, and wherein:

if the first and second bars intersect at or near both their first ends, substantially forming a caret shape, the plane is at a first focus distance;

if the first and second bars bisect each other, the plane is at a second focus distance; and if the first and second bars intersect each other at or near both their second ends, substantially forming a V shape, the plane is at a third focus distance.

13. The system of claim 9, further comprising one or more side-emitting confirmation light sources coupled to the fixture and pointing toward the plane intersected by the optical axis.

14. The system of claim 13 wherein the side-emitting illumination light sources, the side-emitting targeting light sources, and the side-emitting confirmation light sources each emit different colored light.

* * * * *